A United States Patent [19] [11] Patent Number: 5,878,318
Sako et al. [45] Date of Patent: Mar. 2, 1999

[54] AUTOMATIC DOCUMENT FEEDER

[75] Inventors: Masahiro Sako; Hiroshi Kobayashi; Toru Tanjo; Hiroyuki Harada; Kazuhisa Kondo; Jun Kusakabe, all of Osaka, Japan

[73] Assignee: Mita Industrial Co., Ltd., Osaka, Japan

[21] Appl. No.: 5,833

[22] Filed: Jan. 12, 1998

[30] Foreign Application Priority Data

Jan. 17, 1997 [JP] Japan .................................. 9-007017

[51] Int. Cl.[6] .................................................. G03G 15/00
[52] U.S. Cl. .......................................... 399/367; 399/365
[58] Field of Search ..................................... 399/124, 361, 399/365, 367, 373; 271/10.01, 264, 273

[56] References Cited

U.S. PATENT DOCUMENTS 3,713,735  1/1973  Wiber ....................................... 399/124
5,363,184  11/1994  Matsuo et al. ........................... 399/367
5,412,462   5/1995  Matsuo et al. ........................... 399/367
5,511,774   4/1996  Lyga ........................................ 271/273
5,576,823  11/1996  Kakuta et al. ........................... 399/367

*Primary Examiner*—Sandra Brase
*Attorney, Agent, or Firm*—Beveridge, DeGrandi, Weilacher & Young, LLP

[57] ABSTRACT

In an automatic document feeder, an original tray has an original platen on its upper surface. Originals put on the original platen are fed along a conveying path by conveying rollers and conveyance auxiliary rollers. The originals fed are separated one at a time by separating belts and separating rollers which are arranged above and below a conveying path. When a conveyance guide plate constituting a part of the original platen is removed upward, the separating rollers, the conveying rollers, and the conveyance auxiliary rollers and a portion for supporting the rollers are exposed upward, so that maintenance such as replacement of components such as the separating rollers, the conveying rollers and the conveyance auxiliary rollers can be performed.

15 Claims, 11 Drawing Sheets

AUTOMATIC DOCUMENT FEEDER

CROSS REFERENCE TO RELATED APPLICATION

This application claims priority benefits under 35 USC §119 of Japanese Patent Application Serial No. 9-7017 filed on Jan. 17, 1997, the disclosure of which is incorporated by reference.

BACKGROUND OF THE INVENTION

1. Field of the Invention

The present invention relates to an automatic document feeder mounted on an image processor such as a copying machine, a facsimile, or an image reader and so adapted as to feed an original from which an image is to be read by the image processor to a reading section of the image processor and return the original from which the image has been read to a tray and an original platen.

2. Description of Related Arts

An automatic document feeder mounted on a copying machine, for example, and so adapted as to automatically feed an original set on an original platen to a transparent platen of the copying machine and then return the original to a tray and the original platen has been conventionally known.

In this type of the automatic document feeder, the originals set on the original platen are fed to a conveying path by feeding means including a conveying roller, for example. The originals (a bundle of originals) fed are separated one at a time by separating means including a pair of upper and lower separating rollers with a conveying path interposed therebetween, and only the lowermost original is further fed to a conveying path on the downstream side of the separating means.

The conveying roller and the separating rollers are consumable components. When a predetermined time period has elapsed, maintenance such as replacement of the consumable components with new components is performed.

However, the conventional automatic document feeder is so adapted as to open an endless-shaped conveying belt and a conveying unit including its driving mechanism which are opposite to a transparent platen in the main body of the copying machine and its driving mechanism from the lower surface of the main body of the automatic document feeder and remove and mount the conveying roller and the separating rollers from below the main body in order to replace the conveying roller and the separating rollers.

The maintenance work from below the automatic document feeder has conventionally been difficult to perform as mentioned above. Further, in order to open the conveying unit, work for releasing the connection between the conveying unit and a driving mechanism is required. As a result, it takes a lot of time and labor to perform maintenance such as replacement of the conveying roller and the separating rollers, combined with the fact that the work is performed from below.

SUMMARY OF THE INVENTION

Therefore, an object of the present invention is to provide an automatic document feeder capable of easily maintaining feeding means and separating means.

In order to attain the above-mentioned object, in a preferred mode of the present invention, an automatic document feeder comprises an original tray having an upper surface which comprises an original platen on which originals are put, feeding means for feeding the originals set on the original platen to a conveying path, upper and lower separating means arranged with the conveying path interposed therebetween for separating the originals fed by the feeding means one at a time, and a cover capable of being opened and closed, which is provided on the original tray and has the upper separating means mounted thereon. The original platen comprises a conveyance guide plate for guiding lower surfaces of the originals fed by the feeding means. The conveyance guide plate has an opening for projecting the feeding means and the lower separating means from below and is provided removably on the original tray. The conveyance guide plate is removed from the original tray, so that the feeding means and the lower separating means are exposed in a state where they can be maintained.

In the present embodiment, after the cover member is opened in a state where the upper surface of an image processor is closed by the automatic document feeder, the conveyance guide plate constituting at least a part of the original platen is removed, so that the feeding means and the lower separating means are exposed upward. Consequently, maintenance such as replacement of the feeding means and the lower separating means can be performed by work from above the automatic document feeder in a closed state. As a result, the maintenance can be very easily performed.

Conventionally, a conveying unit must have been opened for the maintenance, and therefore, complicated work for releasing the connection between the conveying unit and a driving mechanism for driving the conveying unit has been required. On the other hand, in the present invention, no complicated work related to the driving mechanism as in the conventional example is required for work for mounting and removing the conveyance guide plate.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENT

One embodiment of the present invention will be described in detail by taking a circulation type document feeder for a copying machine as an example. However, a circulation type document feeder according to the present invention is not limited to the circulation type document feeder for a copying machine, and is also applicable to a circulation type document feeder for a facsimile and a circulation type document feeder for an image reader connected to a computer or the like. Further, it is also applicable to a non-circulation type document feeder.

Figure 1:
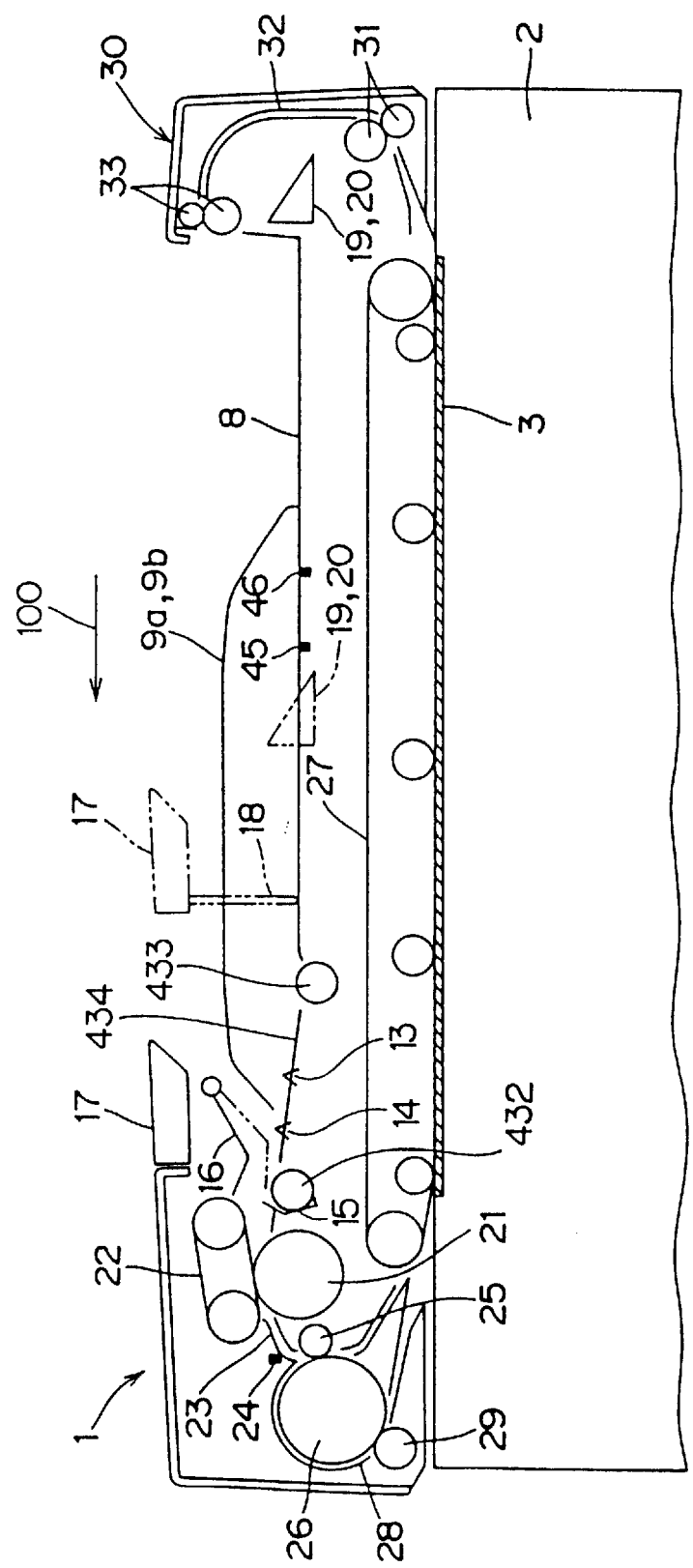
FIG. 1 is a diagram as viewed from the front, which illustrates the internal construction of a circulation type document feeder according to one embodiment of the present invention in simplified fashion.
Figure 2:
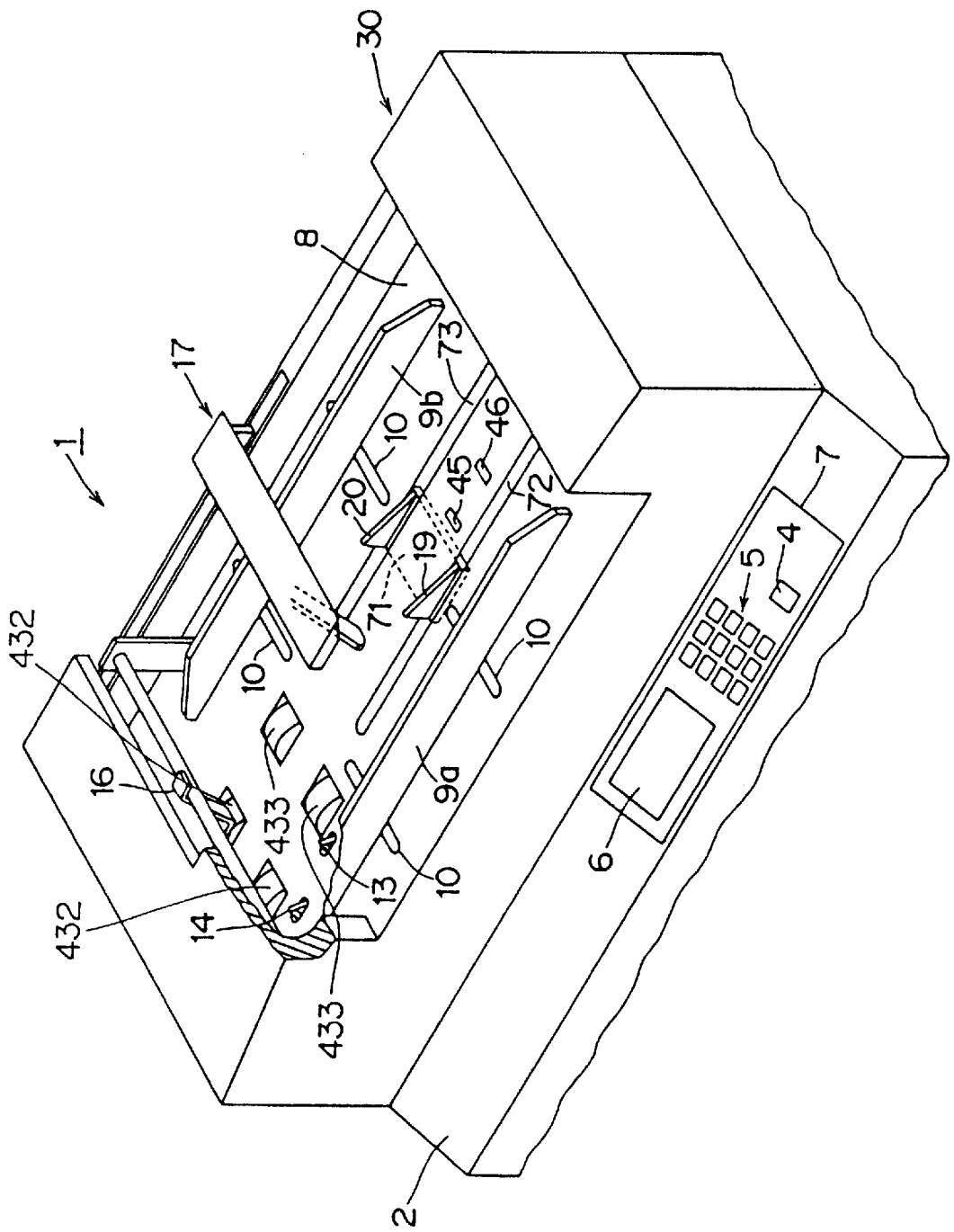
FIG. 2 is a partially cutaway view in perspective showing the circulation type document feeder shown in FIG. 1.

Referring to FIG. 1 while suitably referring to FIG. 2, a circulation type document feeder 1 is mounted on the upper surface of the main body 2 of a copying machine, to automatically feed an original onto a transparent platen 3 arranged on the upper surface of the main body 2 of the copying machine and return the original from which an image has been read to its original position, so that the original can be fed again onto the transparent platen 3. The circulation type document feeder 1 is also used for a cover of the transparent platen 3, and is opened upward with its inner part centered such that the original can be arranged on the transparent platen 3 even manually.

An operation panel 7 on which operation keys such as a print key 4 and a ten-key 5, a display section 6, and the like are arranged is provided, as shown in FIG. 2, on this side of the upper surface of the main body 2 of the copying machine. Operations for the main body 2 of the copying machine and the circulation type document feeder 1, for example, are performed through the operation panel 7.

An original platen 8 for setting originals which are to be fed to the transparent platen 3 thereon is provided in the center of the upper surface of the circulation type document feeder 1. Originals of B5 size (the fifth size of series B in Japanese Industrial Standard) to A3 size (the third size of series A in Japanese Industrial Standard), for example, can be put on the original platen 8. Further, a pair of original width regulating guides 9a and 9b for positioning the originals put on the original platen 8 in a direction perpendicular to the direction of original conveyance (along the width of the originals) is provided on the original platen 8. The original width regulating guides 9a and 9b are synchronously moved in a direction nearer to each other or in a direction away from each other along a rail 10, and are manually operated so as to correspond to the width of the originals put on the original platen 8.

Respective pairs of conveying rollers 432 which serve as a feeding mechanism and conveyance auxiliary rollers 433 arranged on the upstream side thereof in the direction of conveyance for introducing the originals sent on a predetermined set position as well as starting the conveyance of the originals set in the set position are further disposed on the original platen 8. Specifically, the conveying rollers 432 are arranged in parallel in a direction perpendicular to the direction of original conveyance, as shown in FIG. 2. The same is true for the conveyance auxiliary rollers 433.

A preset switch 13 for detecting that the originals are put on the original platen 8 is arranged short of the conveyance auxiliary roller 433 on the front side. When the originals are put on the original platen 8 by a user, the preset switch 13 is turned on, so that the driving of the conveying rollers 432 and the conveyance auxiliary rollers 433 is started. The originals put on the original platen 8 are delivered in a direction indicated by an arrow 100 (leftward in FIG. 1) by the driving of the conveying rollers 432 and the conveyance auxiliary rollers 433.

A set switch 14 is arranged on the downstream side of the preset switch 13 with respect to the direction of original conveyance. The conveying rollers 432 and the conveyance auxiliary rollers 433 are stopped after a predetermined time period has elapsed since the set switch 14 was turned on by the delivered originals. Consequently, the originals are set in a predetermined set position.

Further, a leading end regulating member 15 for regulating the leading ends of the set originals is provided on the downstream side of the conveying rollers 432, so that the originals are prevented from flowing toward the downstream side of the above-mentioned set position in the direction of original conveyance. The leading end regulating member 15 also functions to prevent the originals from being inserted toward the downstream side of the set position in the direction of original conveyance by a user who is unaccustomed to handling the automatic document feeder.

When the print key 4 provided in the main body 2 of the copying machine is pressed in a state where the originals have been set, a partition unit 17 waiting in a home position above the conveying rollers 432 and the conveyance auxiliary rollers 433 (a position indicated by a solid line in FIG. 1) is moved in the opposite direction to the direction of original conveyance by a distance corresponding to the size of the set originals (a position indicated by a two-dot and dash line in FIG. 1). The partition unit 17 is provided with a partition bar 18 which can be displaced to a non-operable state where it retracts into the partition unit 17 and an operable state where the leading ends of the originals returned to the original platen 8 are regulated. At the time of original conveyance, the partition bar 18 is lowered to the operable state, so that the leading ends of the originals returned to the original platen 8 from an original discharge section 30 as described later are lined up, and the originals which have not been conveyed yet and the originals which have been already conveyed are separated from each other.

Furthermore, two operating plates 19 and 20 waiting in a home position (a position indicated by a solid line in FIG. 1) inside the original discharge section 30 are moved in the direction of original conveyance by a distance corresponding to the size of the set originals (a position indicated by a two-dot and dash line in FIG. 1). The operating plates 19 and 20 are connected to each other by a connecting plate 71 below the original platen 8, and are integrally moved along guide rails 72 and 73 formed apart from each other in a direction perpendicular to the direction of original conveyance in the original platen 8.

Besides, each of the operating plates 19 and 20 is a plate-shaped member in an approximately right angled triangular shape having an upward inclined side in the direction of original conveyance, as viewed in a direction perpendicular to the direction of its movement. Accordingly, the original first returned to the original platen 8 is guided by the inclined sides of the operating plates 19 and 20 and is returned without its leading end striking the trailing ends of the originals, which have not been conveyed yet, set in the set position.

On the other hand, a pressing member 16 provided above the conveying roller 432 on the innermost side is displaced to its lowered position indicated by a two-dot and dash line from its raised position indicated by a solid line in FIG. 1, so that the leading ends of the originals set in the set position are pressed against the conveying roller 432. When the leading end regulating member 15 is lowered downward so that the driving of the conveying rollers 432 and the conveying auxiliary rollers 433 is resumed, the conveyance of the originals is started.

Separating rollers 21 are arranged on the downstream side of the leading end regulating member 15 in the direction of original conveyance. Separating belts 22 are provided opposite to the separating rollers 21. The originals (a bundle of originals) fed by the conveying rollers 432 and the conveyance auxiliary rollers 433 are separated from each other by the separating rollers 21 and the separating belts 22, so that only the lowermost original is fed to an original conveying path 23.

When a predetermined time period has elapsed since the original fed to the original conveying path 23 reached a registration switch 24 provided on the original conveying path 23, and the registration switch 24 was turned on, the driving of the conveying rollers 432, the conveyance auxiliary rollers 433, the separating rollers 21 and the separating belts 22 is stopped. At this time, the leading end of the original is sufficiently abutted against a nip position between registration rollers 25 and registration/reversing rollers 26, so that the leading end of the original deflects by a predetermined amount. Consequently, such a phenomenon that the original is fed in a state where it is diagonal to the original conveying path 23, that is, so-called diagonal original feeding is prevented.

Thereafter, the rotation of the registration rollers 25 and the registration/reversing rollers 26 is started at the same timing as operations performed by the main body 2 of the copying machine, whereby the conveyance of the original is resumed. The registration rollers 25 and the registration/reversing rollers 26 are rotated at relatively low speed for a predetermined time period elapsed since the rotation was started, after which they are rotated at relatively high speed. The predetermined time period during which they are rotated at low speed is set to a sufficiently long time period to absorb the deflection of the original. Accordingly, the deflection of the original is gently eliminated, whereby no functional sound produced when the original is rapidly pulled from a state where it deflects (such sound that the original bursts) is produced.

The original fed by the registration rollers 25 and the registration/reversing rollers 26 is arranged in a predetermined position on the transparent platen 3 in the main body 2 of the copying machine by a conveying belt 27. When only an image formed on one surface of the arranged original is read, the image is read as it is by the copying machine. On the other hand, when images formed on both surfaces of the arranged original are read, the original is reversed before an image reading operation is performed.

Specifically, the original arranged on the transparent platen 3 is returned to a reversing path 28 by the conveying belt 27. The returned original is conveyed along the conveying belt 27, the registration/reversing rollers 26 and reversing rollers 29, and the registration rollers 25 and the registration/reversing rollers 26, and is arranged again on the transparent platen 3 by the conveying belt 27. The image reading operation is performed by the copying machine, so that the image formed on the reverse surface of the original is read. Thereafter, the original is reversed again, so that the image formed on the surface of the original is read.

The original from which the image has been read is fed to the original discharge section 30 by the conveying belt 27. The original fed to the original discharge section 30 is conveyed along a discharge path by a pair of discharge rollers 31, and is discharged onto the original platen 8 by a pair of discharge rollers 33. That is, the original from which the image has been read is returned to the original platen 8.

Referring now to FIGS. 3 to 8, description is made of operations in a case where maintenance such as replacement of the separating rollers 21, the conveying rollers 432 and the conveyance auxiliary rollers 433 is performed together with their mounting structure.

Figure 3:
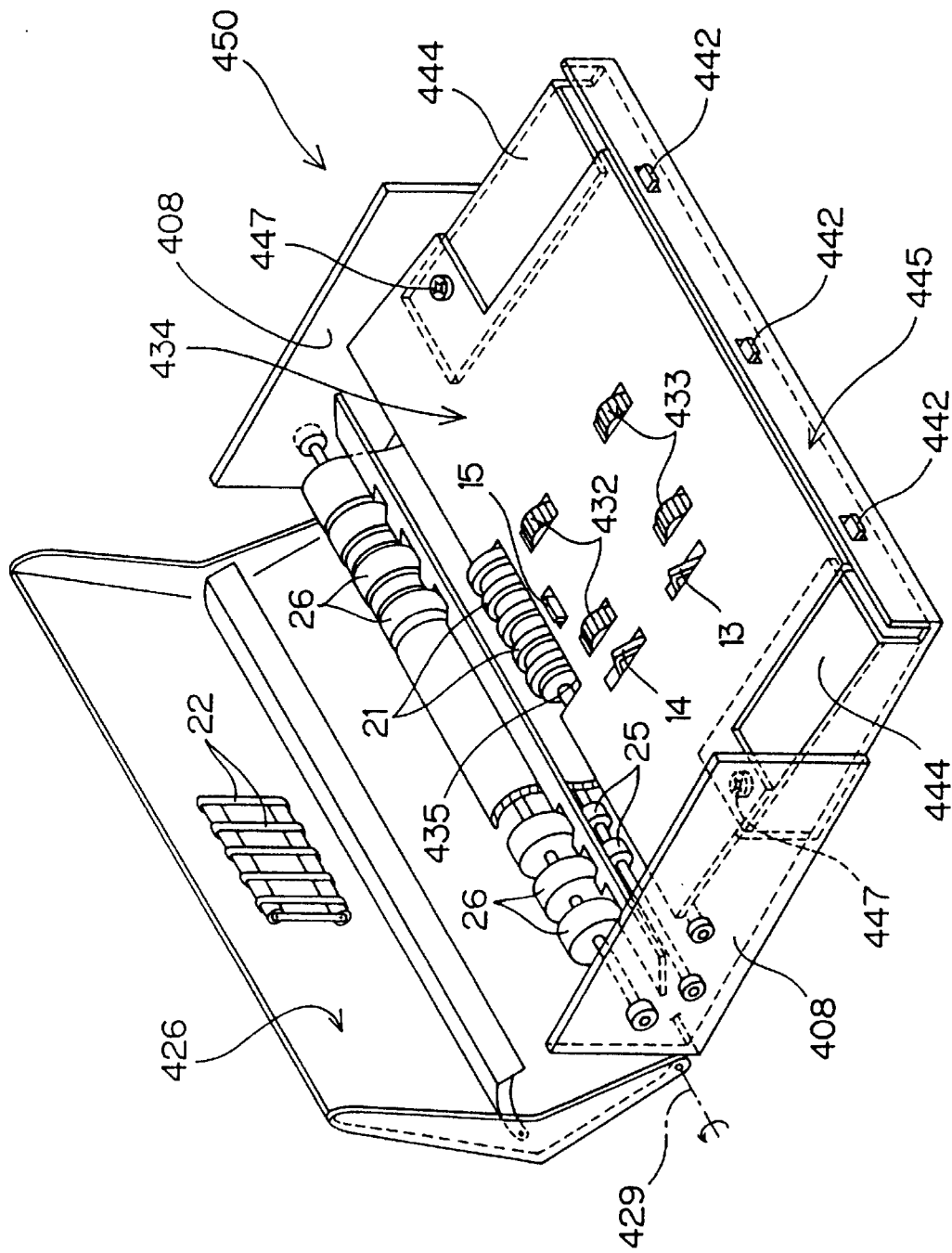
FIG. 3 is a perspective view showing an end of an original tray in a state where a cover is opened.

FIG. 3 illustrates one end of an original tray 450 composing the main body of the circulation type document feeder 1. A cover member 426 which is opened and closed by being rotated around a rotation axis 429 is provided in one end of the original tray 450. A plurality of separating belts 22 are mounted with being exposed on an inner surface of the cover member 426. The cover member 426 is opened, as shown in FIG. 3, so that the separating belts 22, a member for supporting the separating belts, and the like are exposed.

The original tray 450 has front and rear side plates 408 opposite to each other in a direction perpendicular to the direction of original conveyance. Both ends of each of supporting shafts of the registration/reversing rollers 26, the registration rollers 25 and the separating rollers 21 are respectively supported through bearings by the side plates 408.

Figure 4:
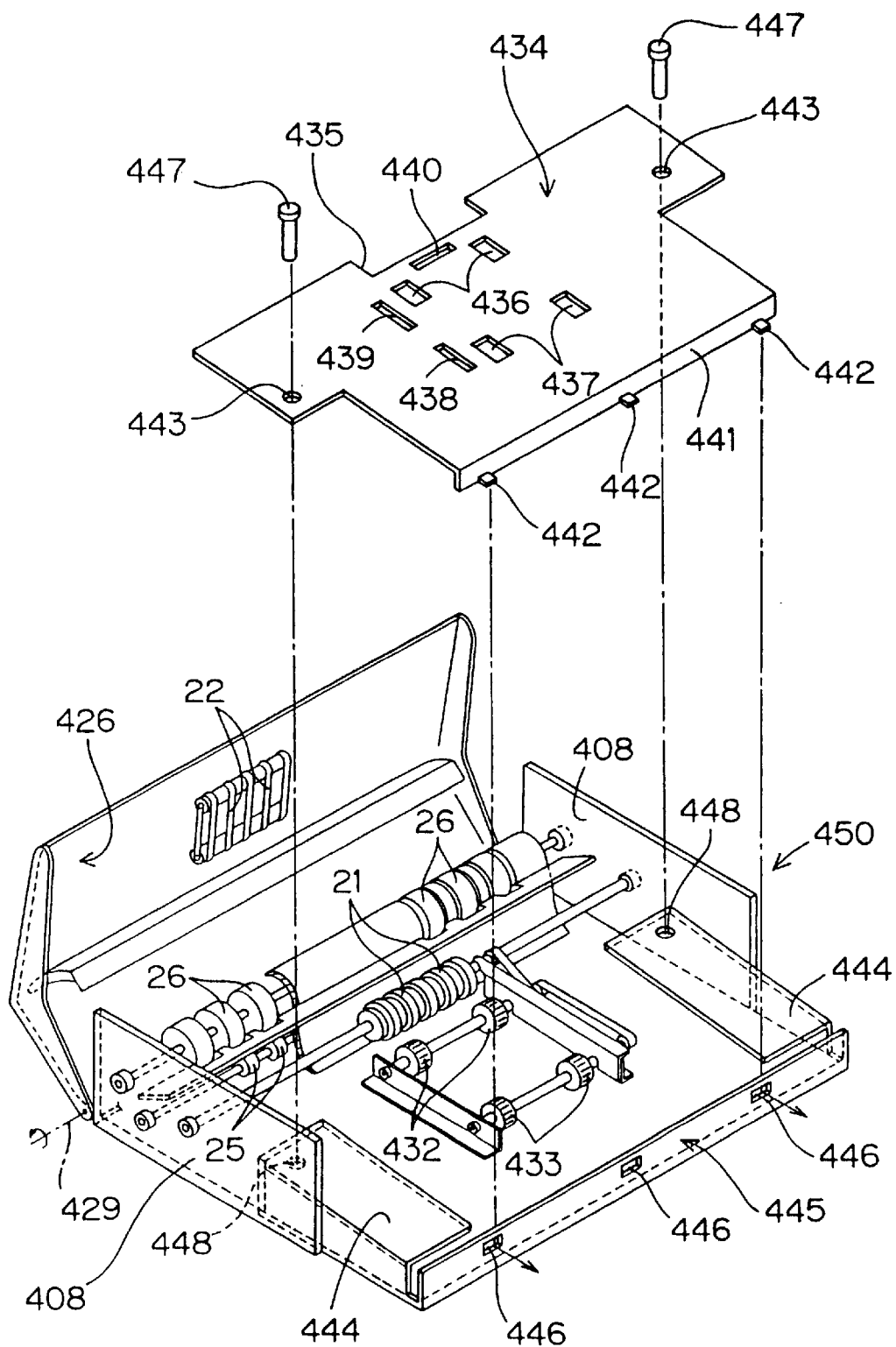
FIG. 4 is an exploded perspective view showing the end of the original tray.

The cover 426 is opened so that a conveyance guide plate 434 constituting a part of the original platen 8 is exposed, as shown in FIG. 3. Referring to FIGS. 3 and 4, in the conveyance guide plate 434, a notch 435 for projecting upper parts of the separating rollers 21 upward from the conveyance guide plate 434 and respective pairs of holes 436 and holes 437 for projecting upper parts of the conveying rollers 432 and the conveyance auxiliary rollers 433 upward from the conveyance guide plate 434 are formed. A recess is provided by the notch 435 and the holes 436 and 437. Further, in the conveyance guide plate 434, through holes 438, 439, and 440 for respectively projecting the preset switch 13, the set switch 14 and the leading end regulating member 15 upward from the conveyance guide plate 434 are formed.

Referring to FIG. 4, the conveyance guide plate 434 has a flange 441 at an edge on the upstream side in the direction of conveyance. The flange 441 is provided with a plurality of engaging projections 442 serving as predetermined portions. Further, the conveyance guide plate 434 has a pair of screw holes vertically penetrating its front and rear ends in a direction perpendicular to the direction of original conveyance.

Figure 5:
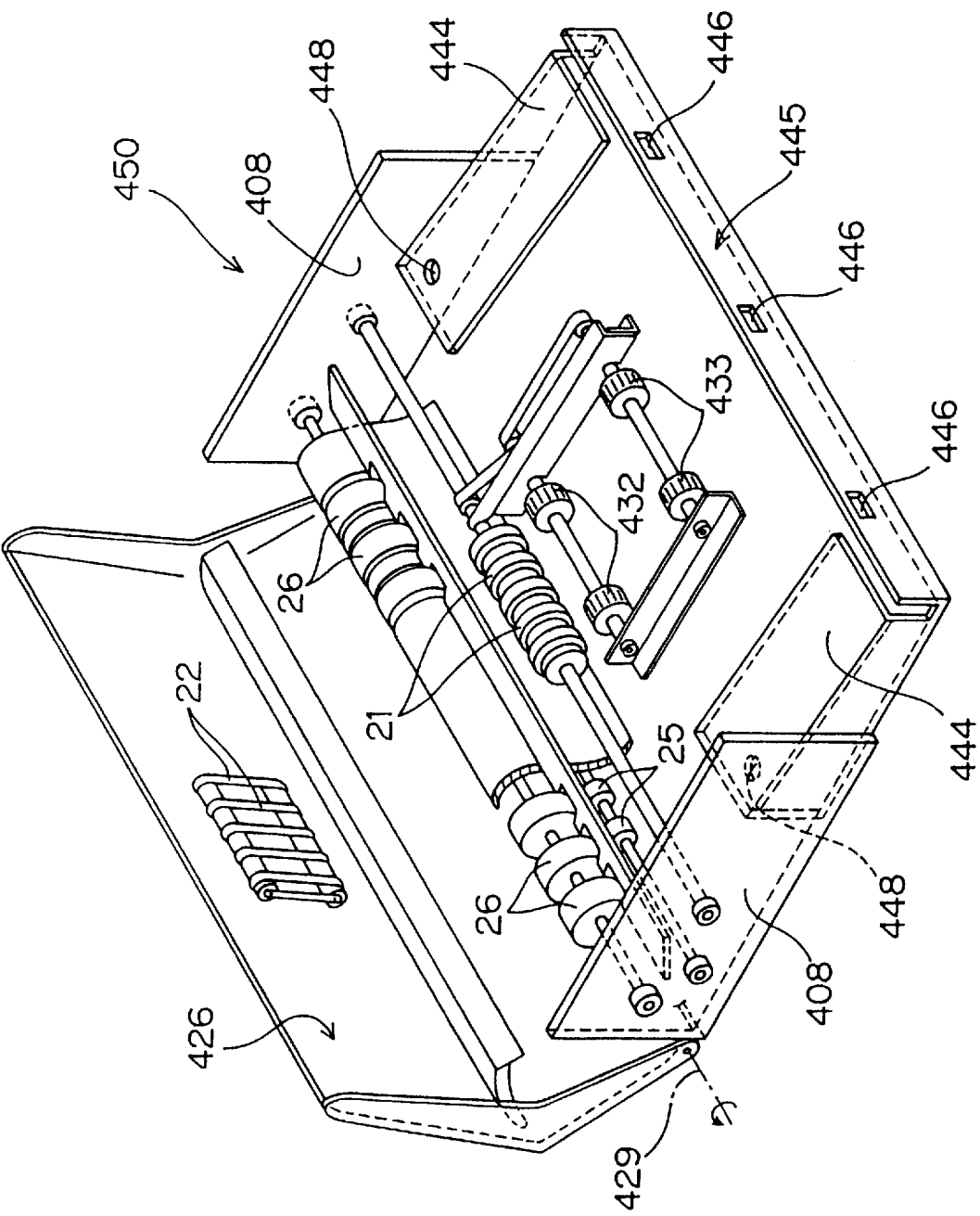
FIG. 5 is a perspective view showing the end of the original tray from which a conveyance guide plate is removed.

On the other hand, referring to FIGS. 4 and 5, the original tray 450 has a pair of receiving plates 444 serving as portions for receiving the front and rear ends in the direction perpendicular to the direction of original conveyance of the conveyance guide plate 434. The receiving portion 444 receives the conveyance guide plate 434 in a state where it is slidable backward and forward in the direction of original conveyance. Further, the original tray 450 has a supporting plate 445 in the direction perpendicular to the direction of conveyance. The front and rear ends of the conveyance guide plate 434 are respectively received by the receiving plates 444, and the engaging projections 442 of the conveyance guide plate 434 are respectively fitted in engaging hole 446 serving as engaging portions formed in the supporting plate 445. Further, screws 447 are respectively inserted into screw holes 448 formed in the receiving plates 444 upon passing through screw holes 443 in the conveyance guide plate 434, so that the conveyance guide plate 434 is fixed to the original tray 450.

In removing the conveyance guide plate 434, therefore, the conveyance guide plates 434 can be easily removed only by removing the screws 447, then sliding the conveyance guide plate 434 along the receiving plates 444 to disengage the engaging projections 442 and the engaging holes 446 from each other.

The separating rollers 21, the conveying rollers 432 and the conveyance auxiliary rollers 433 and a portion for supporting the rollers can be thus exposed upward from the automatic document feeder 1 in a closed state only by opening the cover member 426 as shown in FIG. 3 to remove the conveyance guide plate 434 as shown in FIG. 4 and 5. Therefore, maintenance such as replacement of components such as the separating rollers 21, the conveying rollers 432 and the conveyance auxiliary rollers 433 can be very easily performed.

Figure 6:
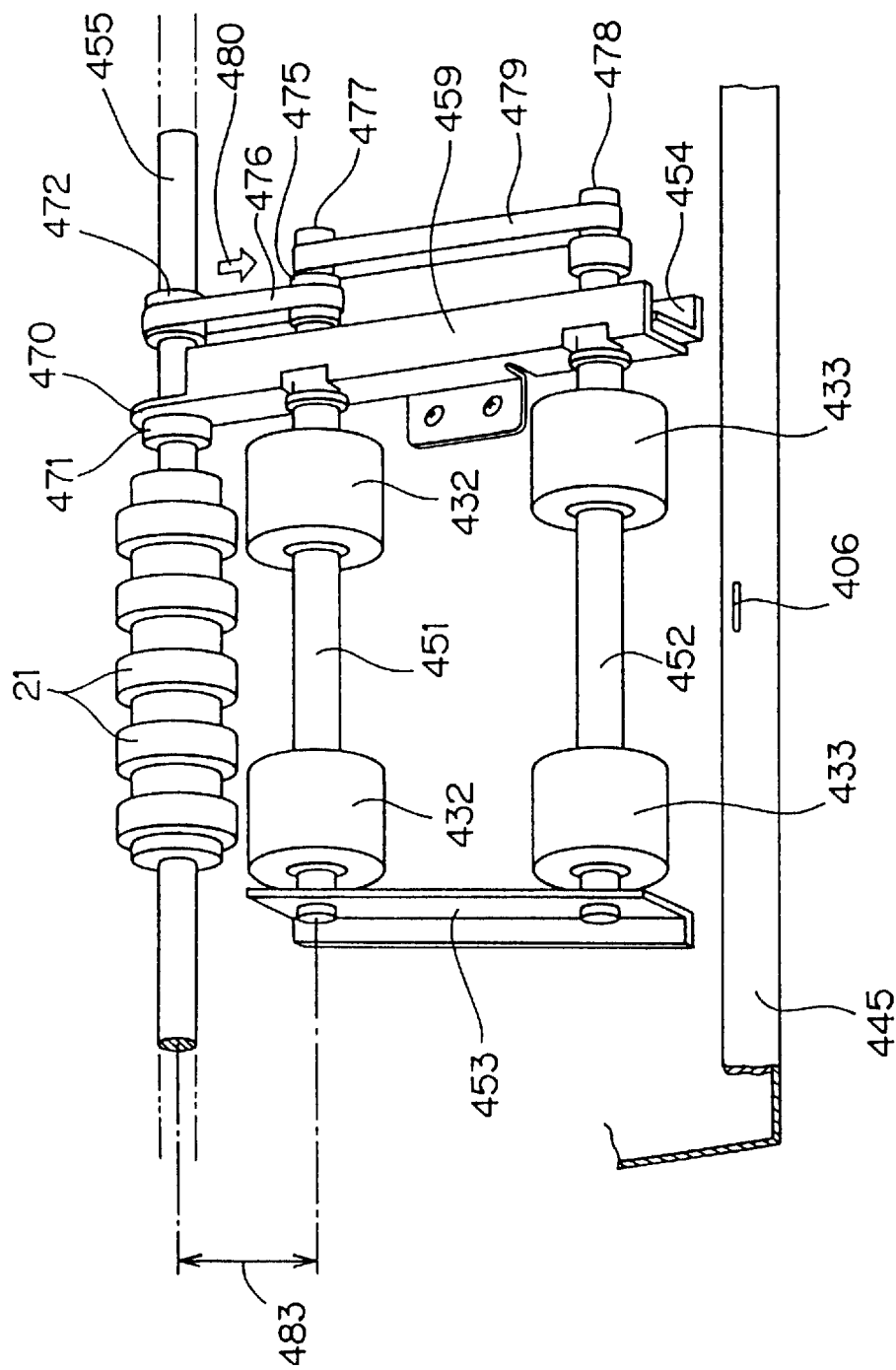
FIG. 6 is a schematic perspective view showing separating rollers and a feeding mechanism as viewed from above.
Figure 7:
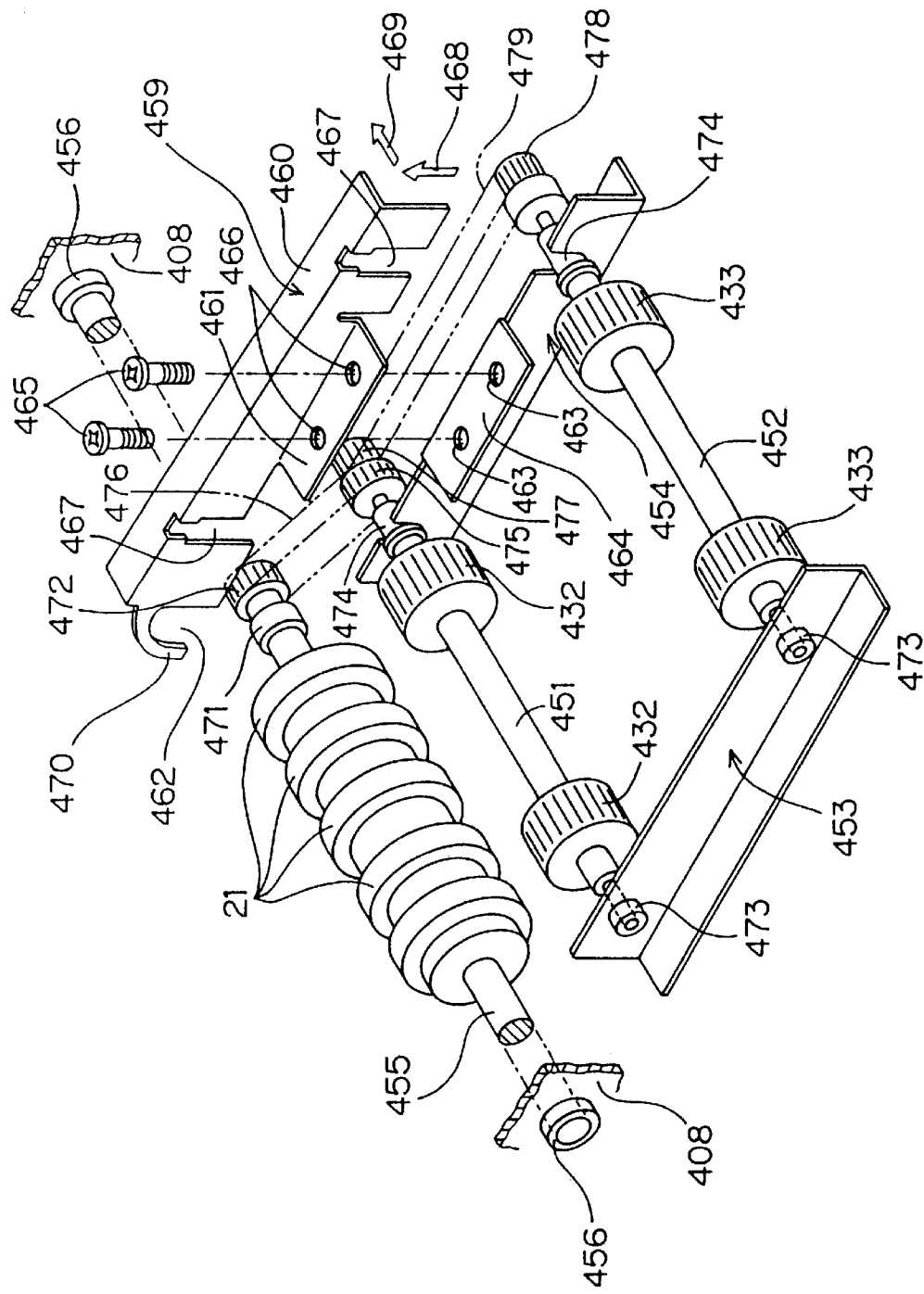
FIG. 7 is an exploded perspective view showing the separating rollers and the feeding mechanism.
Figure 8:
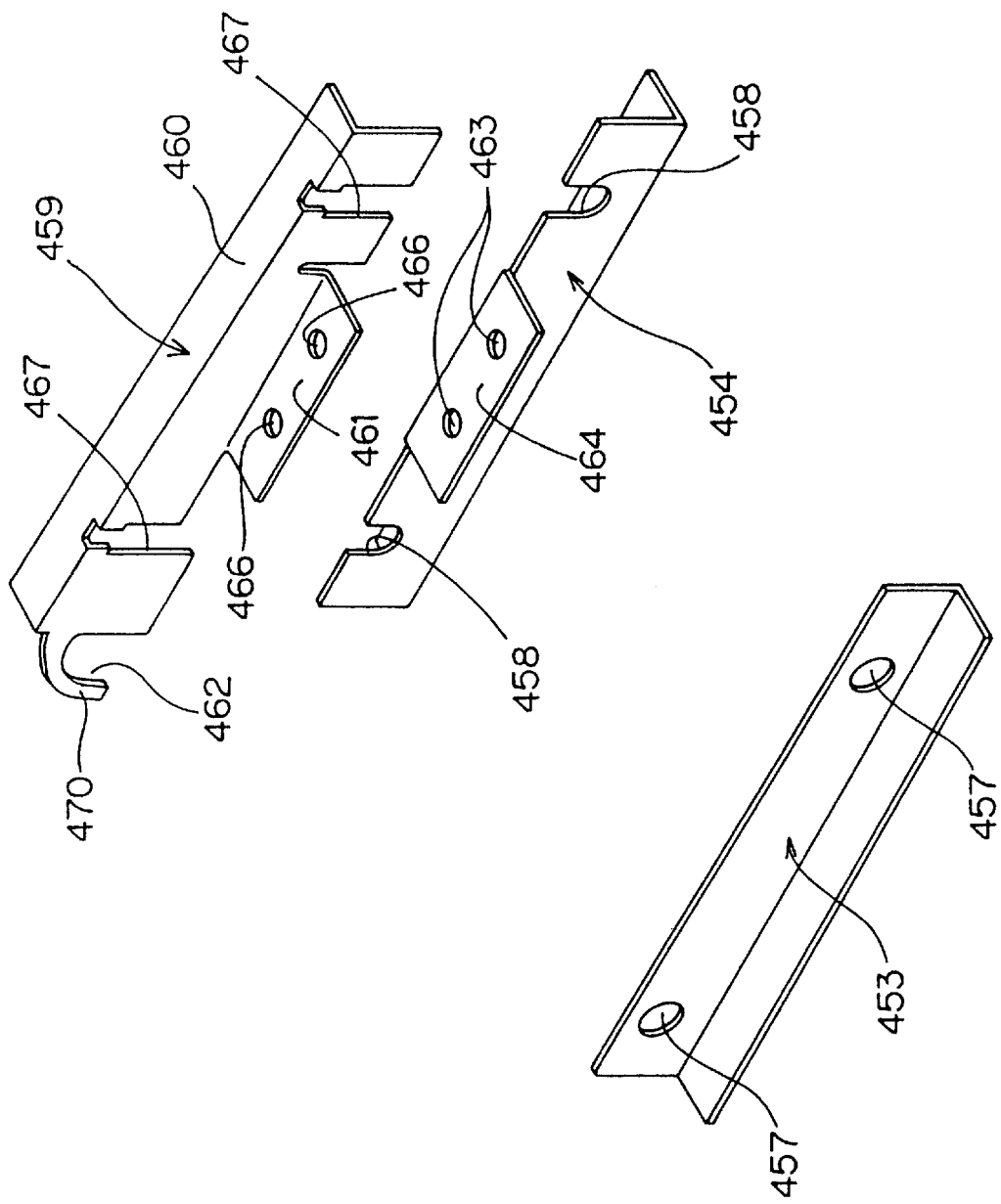
FIG. 8 is an exploded perspective view showing a portion for supporting each conveying roller in the feeding mechanism.

Referring now to FIGS. 6 to 8, operations in removing the conveying rollers 432 and the conveyance auxiliary rollers 433, together with their mounting structure, will be described.

As shown in FIG. 7, a supporting shaft 455 of the separating rollers 21 is supported by the front and rear side plates 408 of the original tray 450 respectively through bearings 456. The supporting shaft 455 provides a third supporting shaft, and the front and rear side plates 408 provide third and fourth side plates.

Front and rear ends of the pair of supporting shafts 451 and 452 for respectively supporting the conveying rollers 432 and the conveyance auxiliary rollers 433 are respectively supported by front and rear side plates 453 and 454 through bearings 473 and 474. The supporting shaft 451 provides a first supporting shaft, and the supporting shaft 452 provides a second supporting shaft. The rear side plate 454 provides a first side plate, and the front side plate 453 provides a second side plate. In FIGS. 7 and 8, the front side plate 453 receives the front ends of the supporting shafts 451 and 452 in a state where the bearings 473 are fitted in supporting holes 457 serving as receiving portions and fitting holes.

On the other hand, referring to FIGS. 7 and 8, in the rear side plate 454, a pair of fitting grooves 458 serving as receiving portions in which bearings 474 for supporting the rear ends of the supporting shafts 451 and 452 are respectively fitted so as to be removable upward is formed. The bearings 474 respectively fitted in the fitting grooves 458 are collectively fixed to the rear side plate 454 by a mounting member 459. The mounting member 459 comprises an angle-shaped main unit 460, a mounting stay 461 for mounting on the rear side plate 454, and a holding groove 462 for holding the supporting shaft 455 of the separating rollers 21. The holding groove 462 provides a distance regulating portion for regulating the distance between the first supporting shaft 451 and the third supporting shaft 455.

The rear side plate 454 has a receiving portion 464 having screw holes 463. The mounting stay 461 and the receiving portion 464 are fastened to each other by screws 465 in a state where the mounting stay 461 of the mounting member 459 is received by the receiving portion 464, to fix the mounting member 459 on the rear side plate 454. Reference numerals 466 denote screw holes, through which the screws 465 are to be respectively inserted, formed in the mounting stay 461.

Furthermore, fitting grooves 467 for fixing each of the bearings 474 with the bearing 474 held from above and below between the fitting groove 467 and the fitting groove 458 of the rear side plate 454 in a state where the mounting member 459 is fixed to the rear side plate 454.

As shown in FIG. 7, the mounting member 459 is removed from the rear side plate 454 to open the fitting grooves 458, and the rear ends of the supporting shafts 451 and 452 of the respective conveying rollers 432 and 433, together with the bearings 474, are raised to be removed upward (indicated by an arrow 468), after which the rear ends of the bearings 474 are moved backward along the axes of the supporting shafts 451 and 452 (indicated by an arrow 469) to remove the front ends of the supporting shafts 451 and 452, together with the bearings 473, from the supporting holes 457 of the front side plate 453. A feeding mechanism including the conveying rollers 432 and the conveyance auxiliary rollers 433 can be thus decomposed in two stages of operations (the number of stages is smaller than that in the conventional example), whereby maintainability can be improved.

On the other hand, the holding groove 462 is defined between a circular arc-shaped arm 470 extending toward the supporting shaft 455 of the separating rollers 21 from the main unit 460 and an end of the main unit 460. A bearing 471 provided in an intermediate portion along the axis of the supporting shaft 455 of the separating rollers 21 is fitted in the holding groove 462, so that the distance 483 between the axes of the supporting shaft 455 of the separating rollers 21 and the supporting shaft 451 of the conveying rollers 432 (see FIG. 6) is regulated.

The side plates 408 of the original tray 450 for supporting the supporting shaft 455 of the separating rollers 21 are provided with a long distance kept between them corresponding to the width of the original of the maximum size. Therefore, the supporting shaft 455 supported between the side plates 408 is inevitably long.

Referring to FIGS. 6 and 7, an endless-shaped belt 476 is wound between a pulley 472 which is provided in the supporting shaft 455 of the separating rollers 21 so as to be integrally rotatable and a pulley 475 which is provided in the supporting shaft 451 of the conveying rollers 432 so as to be integrally rotatable.

Furthermore, a power transmitting mechanism including a pair of pulleys 477 and 478 and an endless-shaped belt 479 is also interposed between the rear end of the supporting shaft 451 of the conveying rollers 432 and the rear end of the supporting shaft 452 of the conveyance auxiliary rollers 433. Consequently, the conveying rollers 432 are rotated in synchronism with the rotation of the separating rollers 21, and the conveyance auxiliary rollers 433 are rotated in synchronism with the rotation of the conveying rollers 432.

A portion on which the pulley 472 is mounted in an intermediate portion along the axis of the supporting shaft 455 of the separating rollers 21 is pulled toward the supporting shaft 451 of the conveying rollers 432 (indicated by an arrow 480 in FIG. 6) by belt tension at the time of driving because the portion is driving-connected to the supporting shaft 451 of the conveying rollers 432 through the endless-shaped belt 476 in the intermediate portion along the axis of the supporting shaft 455 of the long separating rollers 21 whose both ends are supported.

On the other hand, in the present embodiment, the supporting shaft 455 of the separating rollers 21 is held through the bearing 471 by the holding groove 462 of the mounting member 459, to regulate the distance between the axes of the respective supporting shafts 455 and 451 of the separating rollers 21 and the conveying rollers 432. Therefore, the supporting shaft 455 of the long separating rollers 21 does not deflect toward the conveying rollers 432. Consequently, it is possible to prevent the original from being insufficiently conveyed, jammed, and damaged due to the deflection of the supporting shaft 455 of the separating rollers 21.

Figure 9:
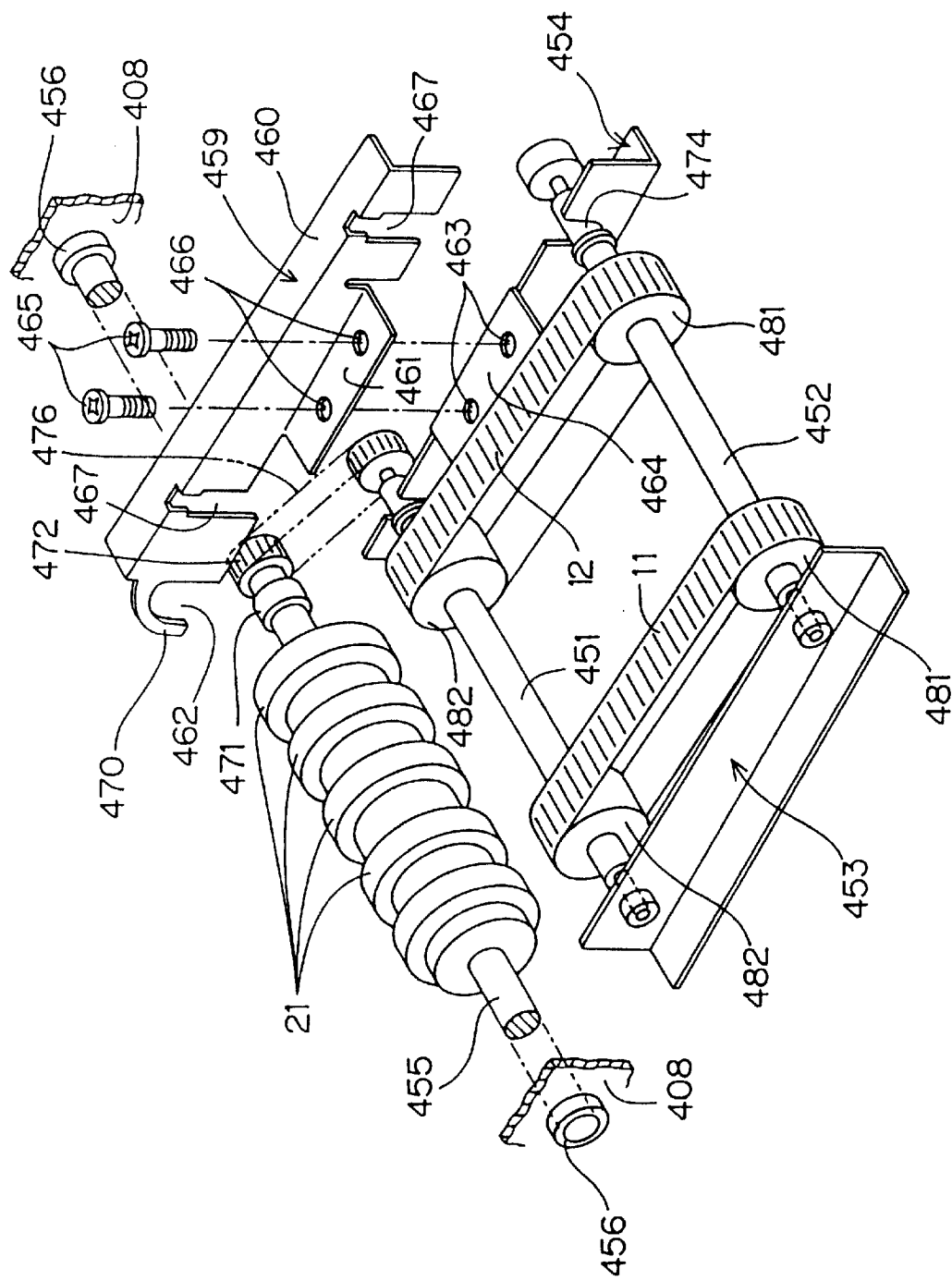
FIG. 9 is an exploded perspective view showing another embodiment of the present invention using feeding belts in place of the conveying rollers.
Figure 10:
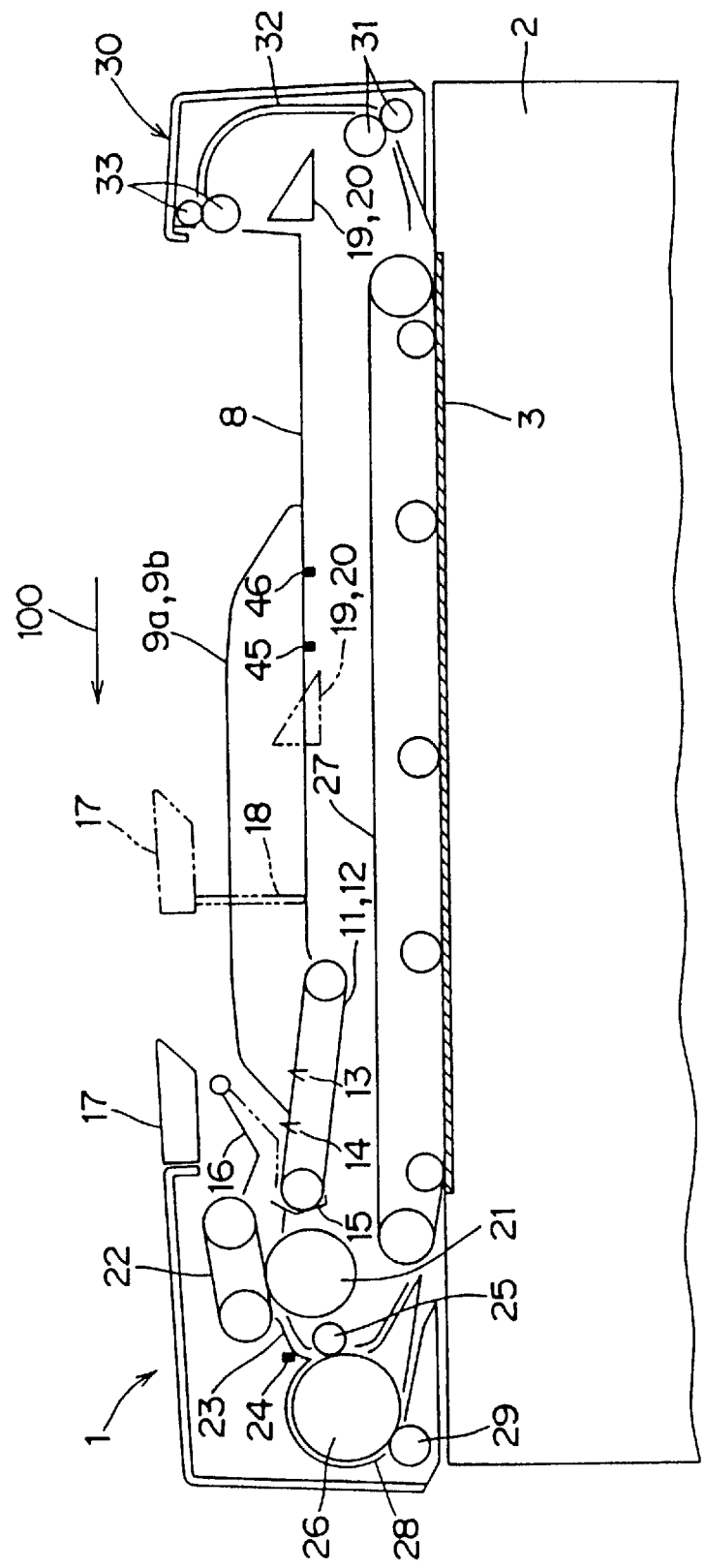
FIG. 10 is a diagram as viewed from the front, which illustrates the internal construction of a circulation type document feeder corresponding to the embodiment shown in FIG. 9 in simplified fashion.
Figure 11:
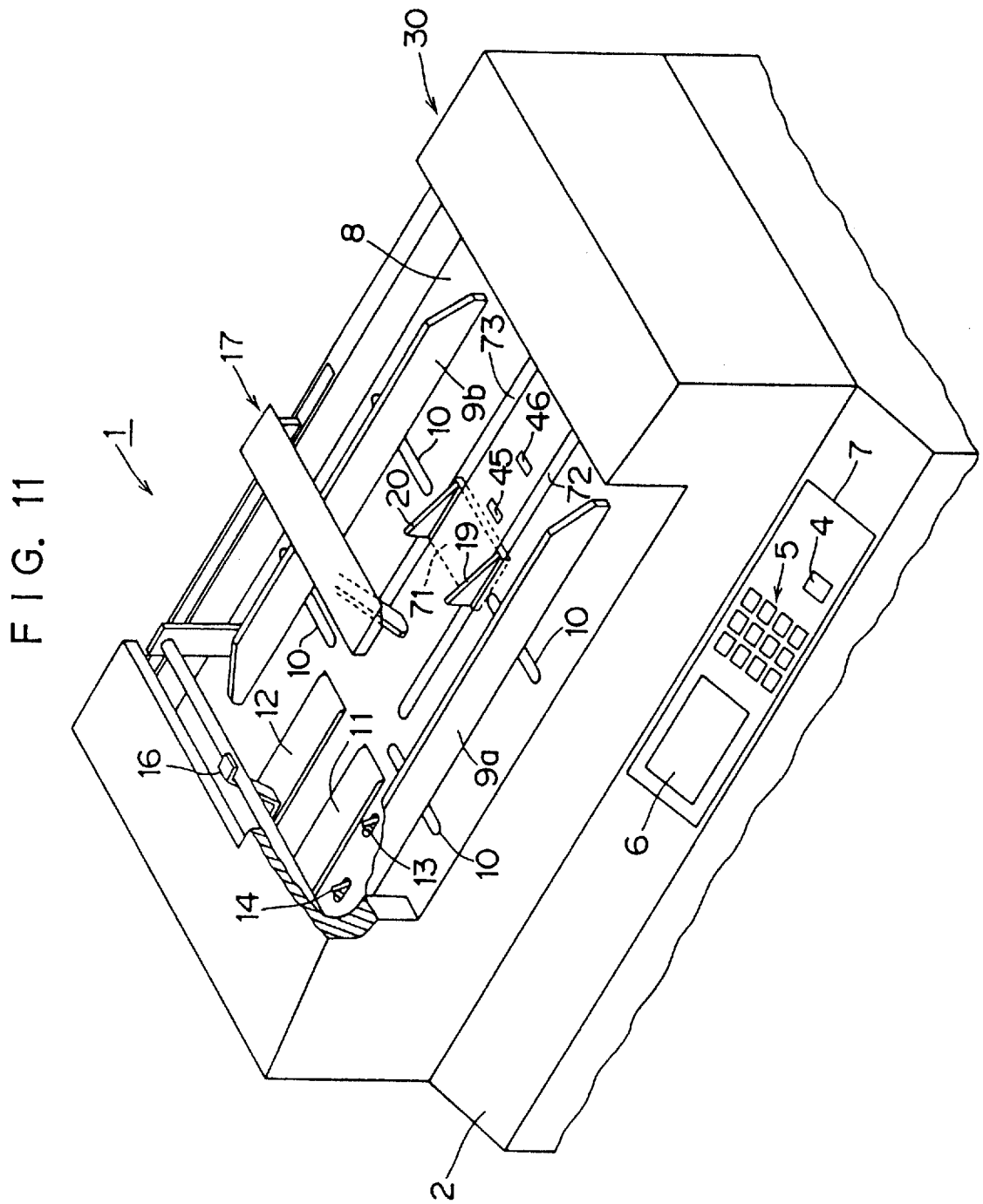
FIG. 11 is a partially cutaway view in perspective showing the circulation type document feeder shown in FIG. 10.

The present invention is not limited to the abovementioned embodiment. For example, although in the present embodiment, the feeding mechanism is of a roller type including the conveying rollers 432 and the conveyance auxiliary rollers 433, the feeding mechanism may be of a belt shape including a pair of feeding belts 11 and 12, as shown in FIG. 9. In this case, the supporting shafts respectively support the pairs of pulleys 481 and 482 around which the feeding belts 11 and 12 are wound. FIGS. 10 and 11 are a cross-sectional view and a perspective view of a circulation type document feeder corresponding to the embodiment shown in FIG. 9.

In addition thereto, various changes can be made in the scope of the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An automatic document feeder comprising:
   an original tray having an upper surface which comprises an original platen on which originals are put;
   feeding means for feeding the originals set on the original platen to a conveying path;
   upper and lower separating means arranged with the conveying path interposed therebetween for separating the originals fed by the feeding means one at a time; and
   a cover capable of being opened and closed, which is provided on the original tray and has the upper separating means mounted thereon,
   the original platen comprising a conveyance guide plate for guiding lower surfaces of the originals fed by the feeding means,
   the conveyance guide plate having an opening for projecting respective parts of the feeding means and the lower separating means from below and provided removably on the original tray,
   the conveyance guide plate being removed from the original tray, so that the feeding means and the lower separating means are exposed in a state where they can be maintained.

2. The automatic document feeder according to claim 1, wherein
   the lower separating means comprises a separating roller.

3. The automatic document feeder according to claim 2, wherein
   the upper separating means comprises an endless separating belt.

4. The automatic document feeder according to claim 1, wherein
   the cover is opened and closed with a rotation around a rotation axis, and the upper and lower separating means are exposed when the cover is opened.

5. The automatic document feeder according to claim 1, wherein
   the feeding means comprises a conveying member and a conveyance auxiliary member arranged on an upstream side of the conveying member with respect to a direction of conveyance, and
   the conveying member and the conveyance auxiliary member are connected to each other such that they can be powertransmitted through a power transmitting mechanism.

6. The automatic document feeder according to claim 5, further comprising
   first and second supporting shafts for respectively supporting the conveying member and the conveyance auxiliary member, and
   first and second side plates for respectively supporting both ends of the first and second supporting shafts through bearings.

7. The automatic document feeder according to claim 6, wherein
   the power transmitting mechanism comprises
   first and second pulleys respectively provided in the first and second supporting shafts so as to be integrally rotatable, and endless belts respectively wound around the first and second pulleys.

8. The automatic document feeder according to claim 6, wherein
   each of the first and second side plates forms a pair of receiving portions receiving the corresponding bearings,
   the pair of receiving portions formed by the first side plate is constituted by a pair of fitting grooves in which the corresponding bearings are fitted so as to be removable upward,
   the pair of receiving portions formed by the second side plate is constituted by a pair of fitting holes in which the corresponding bearings are fitted so as to be axially removable.

9. The automatic document feeder according to claim 8, further comprising
   a mounting member for collectively mounting the pair of bearings fitted in the pair of fitting grooves on the first side plate.

10. The automatic document feeder according to claim 9, wherein
    the mounting member is provided removably on the first side plate.

11. The automatic document feeder according to claim 10, further comprising
    a third supporting shaft for supporting the lower separating means, and
    third and fourth side plates for supporting both ends of the third supporting shaft,
    the distance between the third and fourth side plates being longer than the distance between the first and second side plates.

12. The automatic document feeder according to claim 11, wherein
    the mounting member comprises a distance regulating portion for regulating the distance between the third supporting shaft and the first supporting shaft.

13. The automatic document feeder according to claim 12, further comprising
    the distance regulating portion comprises a holding groove for holding a bearing for supporting the third supporting shaft with the bearing fitted therein.

14. The automatic document feeder according to claim 13, further comprising
a power transmitting mechanism for connecting the lower separating means and the conveying member such that they can be power-transmitted,
the power transmitting mechanism comprising a third pulley provided in an intermediate portion along an axis of the third supporting shaft so as to be integrally rotatable, a fourth pulley provided in an end along the axis of the first supporting shaft so as to be integrally rotatable, and an endless belt wound around the third and fourth pulleys.

15. The automatic document feeder according to claim 1, wherein the original tray comprises a receiving portion slidably receiving the conveyance guide plate in a predetermined direction, an engaging portion engaged with a predetermined portion of the conveyance guide plate which is slid along the receiving portion, and a screw for fixing the conveyance guide plate to the receiving portion in a state where the predetermined portion of the conveyance guide plate is engaged with the engaging portion.

* * * * *